(12) United States Patent
Takeishi et al.

(10) Patent No.: US 8,402,757 B2
(45) Date of Patent: Mar. 26, 2013

(54) WASTE HEAT CONTROL APPARATUS

(75) Inventors: Hiroaki Takeishi, Oobu (JP); Mitsuo Hara, Ichinomiya (JP); Daisuke Nakanishi, Aichi-ken (JP); Hisashi Iida, Kariya (JP); Koichi Ban, Toukai (JP)

(73) Assignee: Denso Corporation, Kariya (JP)

( * ) Notice: Subject to any disclaimer, the term of this patent is extended or adjusted under 35 U.S.C. 154(b) by 404 days.

(21) Appl. No.: 12/753,346

(22) Filed: Apr. 2, 2010

(65) Prior Publication Data

US 2010/0251703 A1 Oct. 7, 2010

(30) Foreign Application Priority Data

Apr. 3, 2009 (JP) .................................. 2009-090901

(51) Int. Cl.
*F01N 5/02* (2006.01)
(52) U.S. Cl. ................. 60/320; 60/274; 60/285; 60/286
(58) Field of Classification Search .................... 60/274, 60/285–287, 295–301
See application file for complete search history.

(56) References Cited

U.S. PATENT DOCUMENTS

| | | | | |
|---|---|---|---|---|
| 5,247,909 | A * | 9/1993 | Simmons ....................... | 123/1 A |
| 5,293,741 | A | 3/1994 | Kashiyama et al. | |
| 5,735,238 | A | 4/1998 | Russ et al. | |
| 5,850,811 | A | 12/1998 | Tomisawa et al. | |
| 6,155,042 | A * | 12/2000 | Perset et al. .................... | 60/278 |
| 6,318,074 | B1 * | 11/2001 | Nishimura et al. ............. | 60/284 |
| 6,318,077 | B1 * | 11/2001 | Claypole et al. ................ | 60/303 |
| 6,334,431 | B1 | 1/2002 | Kanehiro et al. | |
| 6,702,190 | B1 * | 3/2004 | Nohl et al. ............... | 237/12.3 C |
| 6,789,512 | B2 | 9/2004 | Duvinage et al. | |
| 7,730,723 | B2 * | 6/2010 | Yaguchi et al. .................. | 60/597 |
| 2004/0055283 | A1 | 3/2004 | Iihoshi et al. | |
| 2004/0144084 | A1 * | 7/2004 | Hara ............................. | 60/288 |
| 2006/0288983 | A1 | 12/2006 | Watanabe et al. | |
| 2007/0062178 | A1 * | 3/2007 | Yang .............................. | 60/278 |
| 2007/0062179 | A1 * | 3/2007 | Leone ............................ | 60/285 |
| 2007/0084425 | A1 | 4/2007 | Hirose et al. | |
| 2008/0210208 | A1 * | 9/2008 | Tateno .......................... | 123/689 |
| 2008/0264040 | A1 * | 10/2008 | Leone et al. .................... | 60/285 |
| 2009/0049832 | A1 * | 2/2009 | Hase ............................. | 60/320 |

FOREIGN PATENT DOCUMENTS

| | | |
|---|---|---|
| JP | 61-186766 | 11/1986 |
| JP | 2-96476 | 8/1990 |
| JP | 4-194330 | 7/1992 |
| JP | 5-21500 | 1/1993 |
| JP | 10-921 | 1/1998 |

(Continued)

OTHER PUBLICATIONS

U.S. Appl. No. 13/027,577, Takeshi et al, filed Feb. 15, 2011.

(Continued)

*Primary Examiner* — Thomas Denion
*Assistant Examiner* — Jesse Bogue
(74) *Attorney, Agent, or Firm* — Nixon & Vanderhye P.C.

(57) ABSTRACT

The waste heat control apparatus is used in a heat recovery system for recovering and reusing waste heat of an engine. The waste heat control apparatus includes a plurality of waste heat amount adjusting sections activated to increase an amount of the waste heat of the engine, and a control section which performs waste heat control in accordance with a heat utilization demand to increase the amount of the waste heat of the engine by activating at least one of the plurality of waste heat amount adjusting sections.

18 Claims, 8 Drawing Sheets

FOREIGN PATENT DOCUMENTS

| | | |
|---|---|---|
| JP | 2909219 | 4/1999 |
| JP | 11-324746 | 11/1999 |
| JP | 2000-240547 | 9/2000 |
| JP | 3127168 | 11/2000 |
| JP | 2002-180871 | 6/2002 |
| JP | 3347950 | 9/2002 |
| JP | 2004-116310 | 4/2004 |
| JP | 2005-16465 | 1/2005 |
| JP | 2007-9705 | 1/2007 |
| JP | 2007-077840 | 3/2007 |
| JP | 2007-113413 | 5/2007 |

OTHER PUBLICATIONS

Office Action (1 pg.) dated May 15, 2012 issued in corresponding Japanese Application No. 2009-090901 with an at least partial English-language translation thereof (2 pgs.).

* cited by examiner

WASTE HEAT CONTROL APPARATUS

This application claims priority to Japanese Patent Application No. 2009-90901 filed on Apr. 3, 2009, the entire contents of which are hereby incorporated by reference.

BACKGROUND OF THE INVENTION

1. Field of the Invention

The present invention relates to a waste heat control apparatus for controlling an amount of waste heat of an engine in accordance with a heat utilization demand.

2. Description of Related Art

Combustion energy generated by fuel combustion in an engine mounted on a vehicle contains a lot of heat energy other than the kinetic energy used to run the vehicle. This heat energy can be used to heat a vehicle cabin, or warm up a catalyst mounted on an exhaust pipe of the engine. For example, it is known to recover engine waste heat contained in engine cooling water, and use the recovered engine waste heat for space heating.

Further, there are proposed various techniques for implementing early warm-up of a catalyst by increasing an exhaust temperature by controlling ignition timing or opening/closing timing of inlet and exhaust valves. For example, refer to Japanese Patent Application Laid-open No. 11-324746.

However, there may occur a case in which the ignition timing or valve opening/closing timings cannot be changed depending on the running state of the engine. In this case, since the exhaust temperature cannot be increased, early warm-up of the catalyst can not be implemented. For example, when the engine is running at low load, since the amount of engine waste heat is small, there may occur a case in which a demanded amount of waste heat cannot be satisfied. Meanwhile, if the ignition timing or valve opening/closing timing is changed regardless of the running state of the engine, the fuel efficiency of the engine may be lowered significantly.

SUMMARY OF THE INVENTION

The present invention provides a waste heat control apparatus for use in a heat recovery system for recovering and reusing waste heat of an engine comprising:

a plurality of waste heat amount adjusting sections activated to increase an amount of the waste heat of the engine; and a control section which performs waste heat control in accordance with a heat utilization demand to increase the amount of the waste heat of the engine by activating at least one of the plurality of waste heat amount adjusting sections.

According to the present invention, there is provided a waste heat control apparatus which makes it possible to perform waste heat control on an engine in accordance a heat utilization demand, while suppressing the disadvantage such as a decrease of an engine running efficiency due to performing the waste heat control to a minimum.

Other advantages and features of the invention will become apparent from the following description including the drawings and claims.

PREFERRED EMBODIMENTS OF THE INVENTION

First Embodiment

Figure 1:
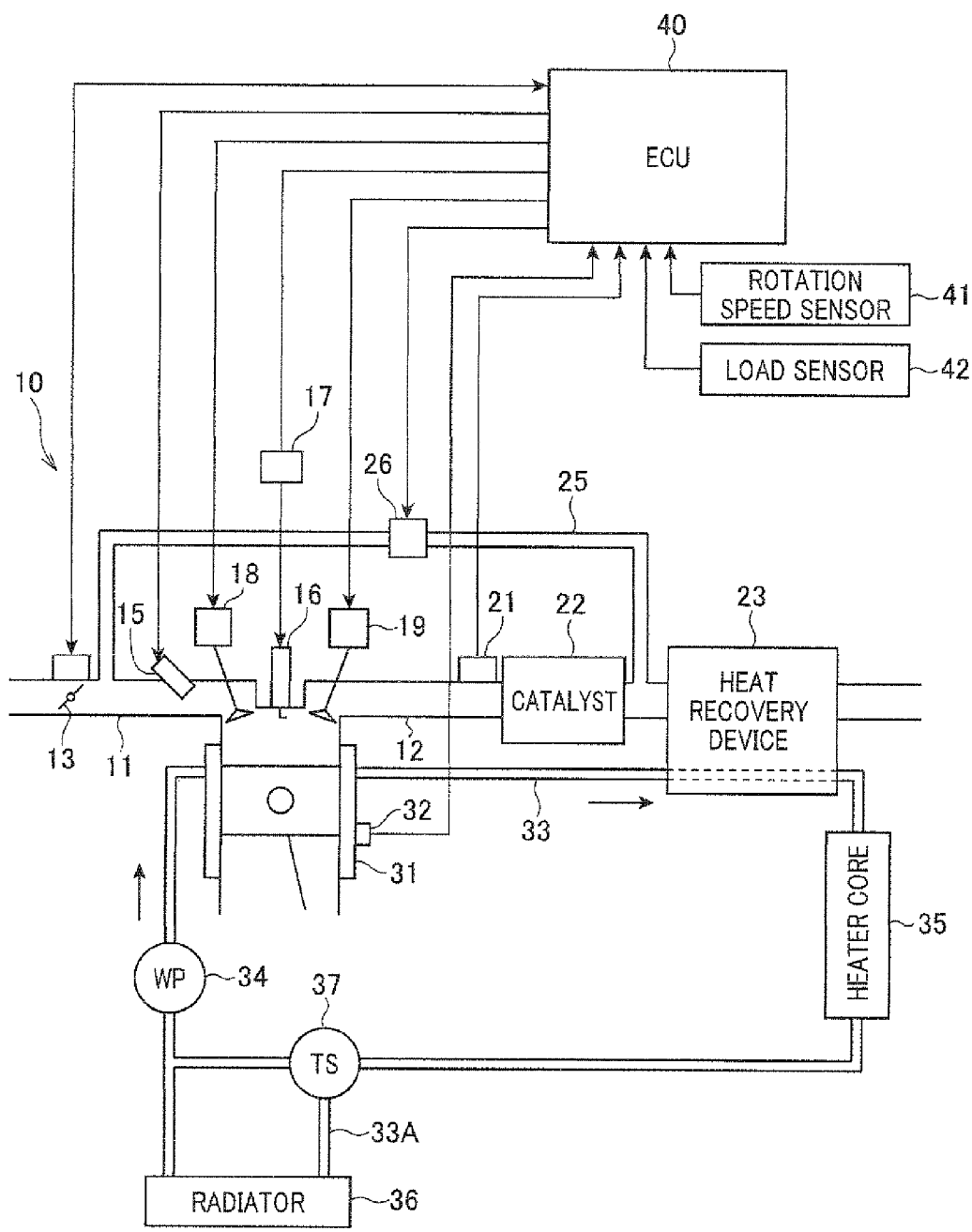
FIG. 1 is a block diagram schematically showing the structure of a waste heat recovery system of an engine including a waste heat control apparatus according to a first embodiment of the invention.

FIG. 1 is a block diagram schematically showing the structure of a waste heat recovery system including waste heat control apparatus according to a first embodiment of the invention.

As shown in FIG. 1, an engine 10, which is a multi-cylinder gasoline engine of the jump-spark ignition type, is connected with an air inlet pipe 11 and an exhaust pipe 12. The air inlet pipe 11 is provided with a throttle valve 13 to regulate the amount of air flowing into the cylinder of the engine 10. The throttle valve 13 is open/close-controlled by a throttle actuator 14 including an electric motor. The throttle actuator 14 is provided with a throttle sensor to detect the opening degree (throttle opening) of the throttle valve 13.

The engine 10 is provided with, for each of the cylinders of the engine 10, an injector 15 to inject-supply fuel to the cylinder, an igniter (ignition device) 17 which causes an ignition plug 16 provided for each of the cylinders to generate ignition sparks, an inlet-side valve driving mechanism 18 to adjust opening/closing timing of the inlet valve provided for each of the cylinders, and an exhaust-side valve driving mechanism 19 to adjust opening/closing timing of the exhaust valve provided for each of the cylinders. In this embodiment, the engine 10 is an inlet port injection engine having the structure in which the injector 15 is disposed in the vicinity of the inlet port of the engine. However, the engine 10 may be a direct injection engine having the structure in which the injector 15 is mounted on the cylinder head of the engine. Each of the inlet-side valve driving mechanism 18 and the exhaust-side valve driving mechanism 19 adjusts the advance angle of the inlet-side camshaft or the exhaust-side camshaft. The opening/closing timing of each inlet valve can be shifted to the advance angle side or delay angle side by the inlet-side valve driving mechanism 18. The opening/closing timing of each exhaust valve can be shifted to the advance side or delay side by the exhaust-side valve driving mechanism 19.

The exhaust pipe 12 is provided with an oxygen concentration sensor 21 to measure concentration of oxygen contained in the exhaust gas (referred to as A/F sensor 21 hereinafter), and a catalyst 22 as an exhaust purifying device on the downstream side of the A/F sensor 21. The catalyst 22, which may be a ternary catalyst, eliminates deleterious components from the exhaust gas. The exhaust pipe 12 is further provided with a heat recovery device 23 to recover heat energy (exhaust heat) contained in the exhaust gas on the downstream side of the catalyst 22. The heat recovery device 23 recovers heat from the exhaust gas by transmitting the heat of the exhaust gas to the engine cooling water. The recovered heat can be used as a heat source for heating the vehicle cabin, for example.

The system of this embodiment further includes an EGR device (Exhaust Gas Recirculation device) which introduces part of the exhaust gas to the air inlet side of the engine. An EGR pipe 25 is disposed between the air inlet pipe 11 and the exhaust pipe 12. The EGR pipe 25 is connected to the air inlet pipe 11 on the downstream side of the throttle valve 13 at one end thereof, and connected to the exhaust pipe 12 on the downstream side (or upstream side) of the catalyst 22 at the other end thereof. The EGR pipe 25 is provided with an EGR valve 26 of the electromagnetic type at its midway portion. By adjusting the opening degree of the EGR valve 26, the EGR gas amount can be adjusted.

Next, the structure of the cooling system of the engine 10 is explained.

The engine 10 includes a water jacket 31 formed penetrating through the cylinder block and the cylinder head thereof. The cooling water is circulatingly supplied to the water jacket 31 to cool the engine 10. The temperature of the cooling water inside the water jacket 31 (the cooling water temperature) is measured by a water temperature sensor 32. The water jacket 31 is connected with a circulation channel 33 including a cooling water pipe etc., which is provided with a water pump 34 to circulate the cooling water. In this embodiment, the water pump 34 is a mechanically driven pump driven by the rotation of the engine 10. However, it may be an electrically driven pump. The cooling system may be configured to be capable of adjusting the flow rate of the cooling water by the water pump 34.

The circulation channel 33 is provided so as to extend toward the heat recovery device 23 from the exit end of the water jacket 31, and return to the engine 10 by way of the heat recovery device 23. The circulation channel 33 is provided with a heater core 35 on the downstream side of the heat recovery device 23. The heater core 35 is supplied with air conditioning air from a blower fan (not shown). The air conditioning air is heated when it passes through the heater core 35 or flows in the vicinity of the heater core 35, and supplied to the vehicle cabin as hot air.

The circulation channel 33 splits into two branches at a branching portion located downstream of the heater core 35, one of which indicated by 33A is provided with a radiator 36. The circulation channel 33 is provided with a thermostat 37 at the branching portion to switch the passage of the cooling water between the two branches. When the temperature of the cooling water is lower than the activation temperature of the thermostat 37, the cooling water is prohibited from flowing towards the radiator 36, and accordingly circulates through the circulation channel 33 without releasing heat at the radiator 36. For example, before completion of warm up of the engine 10, the cooling water is restricted from being cooled (or from releasing heat) at the radiator 36. When the temperature of the cooling water exceeds the activation temperature of the thermostat 37, the cooling water is allowed to flow to the side of the radiator 36, and accordingly circulates through the circulation channel 33 while releasing heat at the radiator 36. As a result, the cooling water is kept at a suitable temperature (for example, approximately 80).

The control system of this embodiment includes an ECU (Electronic Control Unit) 40 serving as the waste heat control apparatus. The ECU 40 performs various controls regarding the running of the engine 10. The ECU 40, which is mainly constituted of a microcomputer including a CPU, a ROM and a RAM, performs the various controls by executing various control programs stored in the ROM in accordance depending on the running state of the engine 10. The control system of this embodiment is provided with various sensors to detect the running state of the engine 10, including a rotation speed sensor 41 to measure the engine rotation speed, and a load sensor 42 to measure engine load such as the intake air amount or the back pressure in the air inlet pipe. The sensor signal from these sensors 41 and 42, and also the foregoing A/F sensor 21 and water temperate sensor 32 are inputted to the ECU 40.

The ECU 40 performs fuel injection control by means of the injector 15, ignition timing control by means of the igniter 17, valve timing control by means of the valve driving mechanism 18 and 19, and intake air amount control by means of the throttle valve 13, in accordance with the received various sensor signals. These various controls are performed basically in accordance with adaptation data in order to run the engine at the highest efficiency (highest fuel efficiency). Incidentally, the efficiency characteristic of the engine 10 is determined depending on some parameters including the engine rotation speed and the engine load.

The system of this embodiment aims to increase the fuel efficiency in totality by recovering, from the fuel combustion energy generated by the engine 10, the heat energy as heat loss (energy other than the kinetic energy) and reusing the recovered heat energy. Accordingly, the system of this embodiment performs the waste heat control on the engine 10 in accordance with the heat utilization demand and the engine running state at every moment.

To this end, this embodiment includes a plurality of waste heat amount adjusting sections for increasing the heat energy (heat loss) as the waste heat from the engine 10, and is configured to determine which of the plurality of the waste heat amount adjusting sections should be used to increase the waste heat when there occurs the heat utilization demand such as the space heating demand or the catalyst heating demand.

In this embodiment, the waste heat control is performed to increase the waste heat amount utilizing the fact that the waste heat amount is increased (a) by delaying the ignition timing, (b) by shifting the opening timing of the inlet valve to the advance angle side (that is, by early opening the inlet valve), (c) by shifting the opening timing of the exhaust valve to the delay angle side (that is, by late opening the exhaust valve), and the fact that the waste heat amount can be further increased (d) by a combination of delaying the ignition timing and shifting the opening/closing timing of the inlet and exhaust valves. In order to increase the waste heat amount, it is the most effective to delay the ignition timing. By early opening the inlet valve, or by late opening the exhaust valve, since the valve overlap period during which both the inlet and exhaust valves are open is prolonged, the internal EGR amount is increased and accordingly the waste heat amount is increased. However, increasing the internal EGR amount may cause a disadvantage such as drivability degradation depending on the engine running state etc. Accordingly, there is restriction in increasing the internal EGR amount depending on the engine running state etc.

Figure 2:
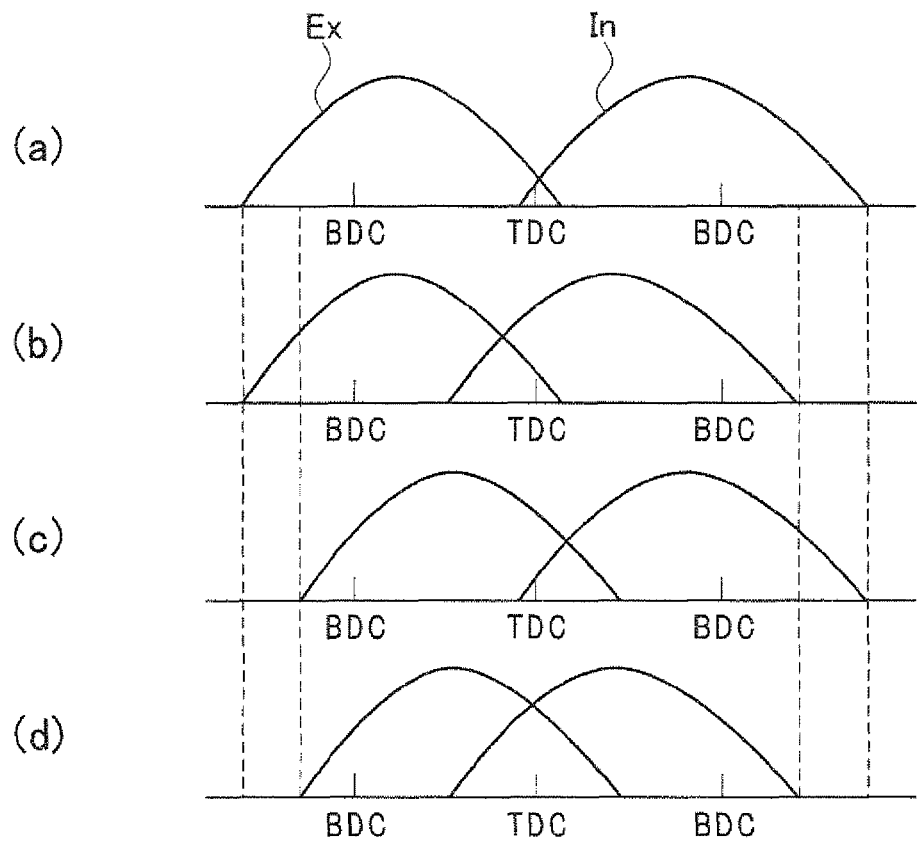
FIG. 2 is a time chart explaining opening/closing timing of engine valves controlled by the waste heat control apparatus of the first embodiment.

FIG. 2 is a time chart showing opening/closing timings of the inlet valve In and the exhaust valve Ex. Section (a) of FIG. 2 shows a case where these valves are opened or closed in accordance with basic opening/closing timings. Section (b) of FIG. 2 shows a case where the opening/closing timing of the inlet valve In is advanced so that the inlet valve In is opened early. Section (c) of FIG. 2 shows a case where the opening/closing timing of the exhaust valve Ex is delayed so that the exhaust valve Ex is opened late. Section (d) of FIG. 2 shows a case where the early opening of the inlet valve In and the late opening control of the exhaust valve Ex are performed at the same time so that the valve overlap period is prolonged to a maximum extent.

This embodiment includes first to third waste heat amount adjusting sections, a control section, and an engine output enhancing section. The first waste heat amount adjusting section performs delaying the ignition timing, and late opening the exhaust valve. The second waste heat amount adjusting section performs delaying the ignition timing, and the early opening the inlet valve. The third waste heat amount adjusting section performs delaying the ignition timing. The functions of the above waste heat amount adjusting sections are implemented by the microcomputer of the ECU 40 executing programs stored in its ROM or RAM.

The first to third waste heat amount adjusting sections are different from one another in the engine running range in which the waste heat adjustment is possible, or the waste heat adjustment can be performed advantageously. Accordingly, in this embodiment, the waste heat control is performed by use of at least one of the first to third waste heat amount adjusting sections which the control section selects depending on the demanded amount of heat or the engine running state. The function of the control section is implemented by the microcomputer of the ECU 40 executing a program stored in its ROM or RAM.

The increase amount of the waste heat obtained by performing the waste heat control is different from among the first to third waste heat amount adjusting sections. This embodiment is configured to select at least one of the first to third waste heat amount adjusting sections depending on the demanded amount of heat to perform the waste heat control. This selection is performed referring to map data sorted in the ROM of the ECU 40, the map data showing, for each of the first to third waste heat amount adjusting sections, the expected increase of the waste heat amount, and the expected decrease of the engine running efficiency (fuel efficiency) due to the increase of the waste heat amount.

Figure 3:
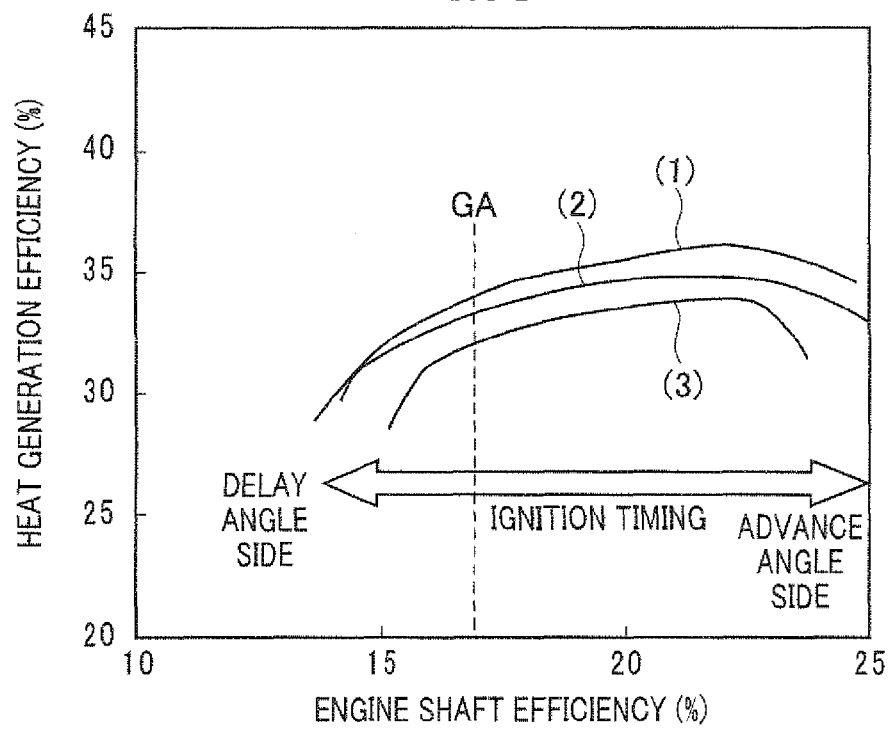
FIG. 3 is a diagram showing a relationship between the engine shaft efficiency and the heat generation efficiency for each of first to third waste heat amount adjusting sections included in the waste heat control apparatus of the first embodiment.

FIG. 3 is diagram showing a relationship between the engine shaft efficiency and the heat generation efficiency for each of the first to third waste heat amount adjusting sections. In FIG. 3, the heat generation efficiency is a ratio of the amount of generated heat (kW) to the total amount of fuel injection (kW).

In FIG. 3, the curve (1) shows the characteristic of the heat generation efficiency when the first waste heat amount adjusting section performs (delaying the ignition timing+late opening the exhaust valve), the curve 2 shows the characteristic of the heat generation efficiency when the second waste heat amount adjusting section performs (delaying the ignition timing+early opening the inlet valve), and the curve (3) shows the characteristic of the heat generation efficiency when the third waste heat amount adjusting section performs (delaying the ignition timing). By comparing these curves, it can be found that the heat generation efficiency is higher in the order of the third waste heat amount adjusting section, the second waste heat amount adjusting section, and the first waste heat amount adjusting section. In FIG. 3, the dotted line GA indicates the operation boundary between the first and second waste heat amount adjusting sections. The driverability is significantly lowered when the internal FGR is performed in a range in which the engine shaft efficiency is lower than GA. Accordingly, the first and second waste heat amount adjusting sections are restricted or prohibited from operating.

Figure 4:
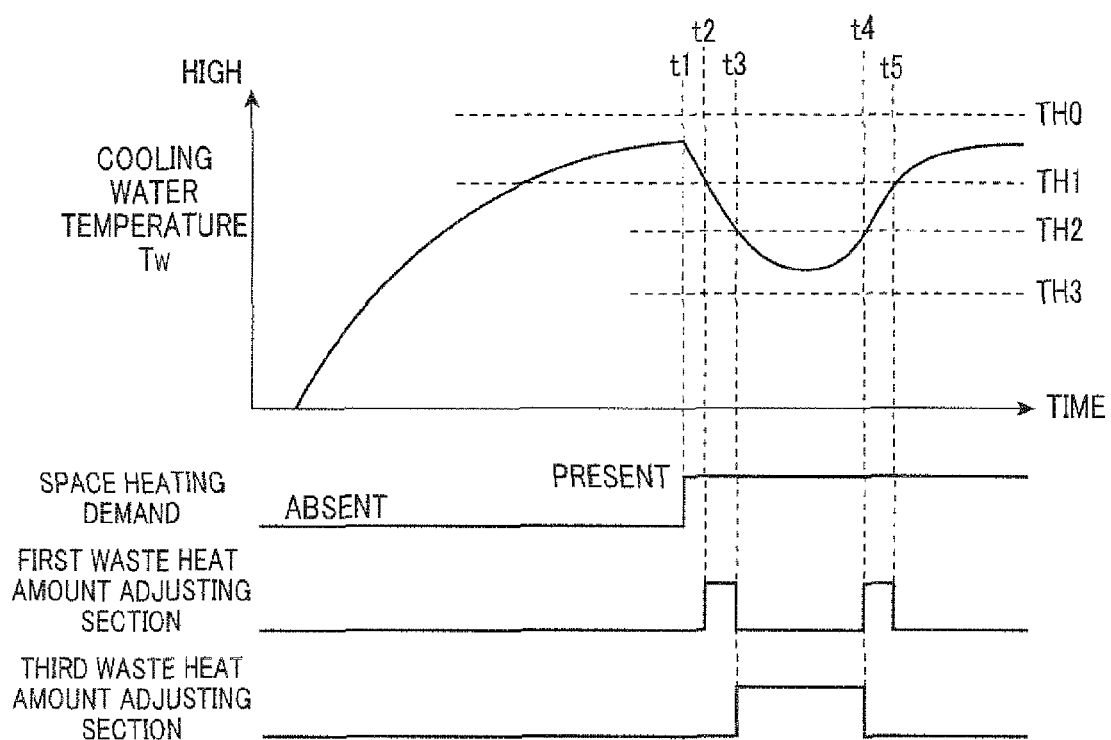
FIG. 4 is a time chart for explaining an outline of waste heat control performed by the waste heat control apparatus of the first embodiment.

Next, the waste heat control performed when the engine 10 is cold-started is explained with reference to FIG. 4. FIG. 4 is a time chart showing transition of the cooling water temperature after the cold-start of the engine, and the progress of the waste heat control with the transition of the cooling water temperature.

As shown in FIG. 4, the cooling water temperature Tw gradually increases from the vicinity of normal temperature after the cold-start of the engine, and reaches a temperature range suitable to the engine 10. In this embodiment, it is assumed that the suitable temperature range is a range from TH0 to TH1. In this range, the engine 10 can be kept at a suitable warmed-up state. The temperature of TH0 is a temperature at which the thermostat 37 activates or turns on. Accordingly, when Tw≧TH0, the thermostat 37 activates or turns on so that the cooling water starts to circulate through the radiator 36 to release heat from the radiator 36. In this embodiment, TH0 is 90° C., and TH1 is 80° C.

Thereafter, when the heat spacing demand occurs as the heat utilization demand at timing t1, heat utilization (hot wind generation) is performed at the heater core 35, as a result of which the cooling water temperature Tw is decreased. If the cooling water temperature Tw is decreased below TH1 as a lower limit of the suitable temperature range, the waste heat control on the engine 10 starts to be performed. This is because when the cooling water temperature Tw is too low, since it is not possible to respond to the space heating demand, the cooling water temperature Tw has to be increased by performing the waste heat control.

In this embodiment, a plurality of temperature thresholds (TH2, TH3) are set on the lower side of the suitable temperature range. The content of the waste heat control is switched depending on the results of the comparison between the cooling water temperature Tw and each of the temperature thresholds. Incidentally, the difference between the cooling water temperature Tw and the lower limit of the suitable temperature range corresponds to the demanded amount of heat.

In the case shown in FIG. 4, when the cooling water temperature Tw decreases and enters the temperature range between TH1 and TH2 at timing t2, the first waste heat amount adjusting section performs the waste heat control (delaying the ignition timing+late opening the exhaust valve). In this temperature range, since the difference between the cooling water temperature Tw and the lower limit of the suitable temperature range is relatively small, and accordingly, the demand amount of heat is not so large, the first waste heat adjusting section which provides the highest heat generation efficiency of the three waste heat adjusting section is selected to perform the waste heat control.

Thereafter, when the cooling water temperature TW further decreases and enters the temperature range between TH2 and TH3, the third waste heat amount adjusting section performs the waste heat control (delaying the ignition timing) in place of the first waste heat amount adjusting section. In this temperature range, since the difference between the cooling water temperature Tw and the lower limit of the suitable temperature range is relatively large, and accordingly, the demand amount of heat is relatively large, the third waste heat adjusting section which is expected to increase the waste heat amount in the largest extent of the three waste heat adjusting section is selected to perform the waste heat control. Besides, since the demanded amount of heat increases at timing t3, responding to this demand causes decrease of the engine shaft efficiency (fuel efficiency). Accordingly, at timing t3, the first waste heat amount adjusting section is switched to the third waste heat amount adjusting section also with the aim to avoid degradation of the driverability.

Alternatively to the above, when the cooling water temperature Tw enters the temperature range between TH1 and TH2, the second waste heat amount adjusting section may perform the waste heat control (delaying the ignition timing+ early opening the inlet valve) instead of the first waste heat adjusting section (delaying the ignition timing+late opening the exhaust valve). Also, it is possible that during the switching from the first waste heat adjusting section to the third waste heat amount adjusting section, the second waste heat adjusting section performs the waste heat control (delaying the ignition timing+early opening the inlet valve).

Thereafter, when the cooling water temperature Tw increases and reaches TH2 at timing t4, the third waste heat amount adjusting section (delaying the ignition timing) may be switched to the first waste heat adjusting section (delaying the ignition timing+late opening the exhaust valve) to perform the heat waste control. When the cooling water temperature Tw further increases and reaches TH1 at timing t5, the heat waste control performed by the first waste heat adjusting section (delaying the ignition timing+late opening the exhaust valve) is terminated.

Although detailed explanation with reference to drawings is omitted, in a case where the catalyst heating demand other than the space heating demand occurs, the waste heat control is performed as follows. When the temperature of the catalyst 22 decreases, and accordingly, the catalyst heating demand occurs, the first waste heat amount adjusting section (delaying the ignition timing+late opening the exhaust valve) is activated to perform the waste heat control if the difference between the target temperature of the catalyst 22 (the catalyst activation temperature) and the actual temperature of the catalyst 22 (the temperature measured by a temperature sensor, or a calculated estimated temperature) is relatively small. On the other hand, if the difference is relatively large, the third waste heat amount adjusting section (delaying the ignition timing) is activated to perform the waste heat control. Incidentally, the catalyst heating demand may occur when the engine is restarted after being stopped by idle-stop control, other than when the temperature of the catalyst is decreased.

It is possible to adopt another waste heat amount adjusting section which increases the waste heat amount by shifting the opening timing of the exhaust valve to the advance angle side (that is, by early opening the exhaust valve). In this case, for example, the waste heat control is performed to delay the ignition timing when the difference between the target temperature and the actual temperature of the catalyst 22 is relatively small (that is, when the demanded amount of heat is relatively small), or to delay the ignition timing and open the exhaust valve early when this difference is relatively large (that is, when the demanded amount of heat is relatively large).

Figure 5:
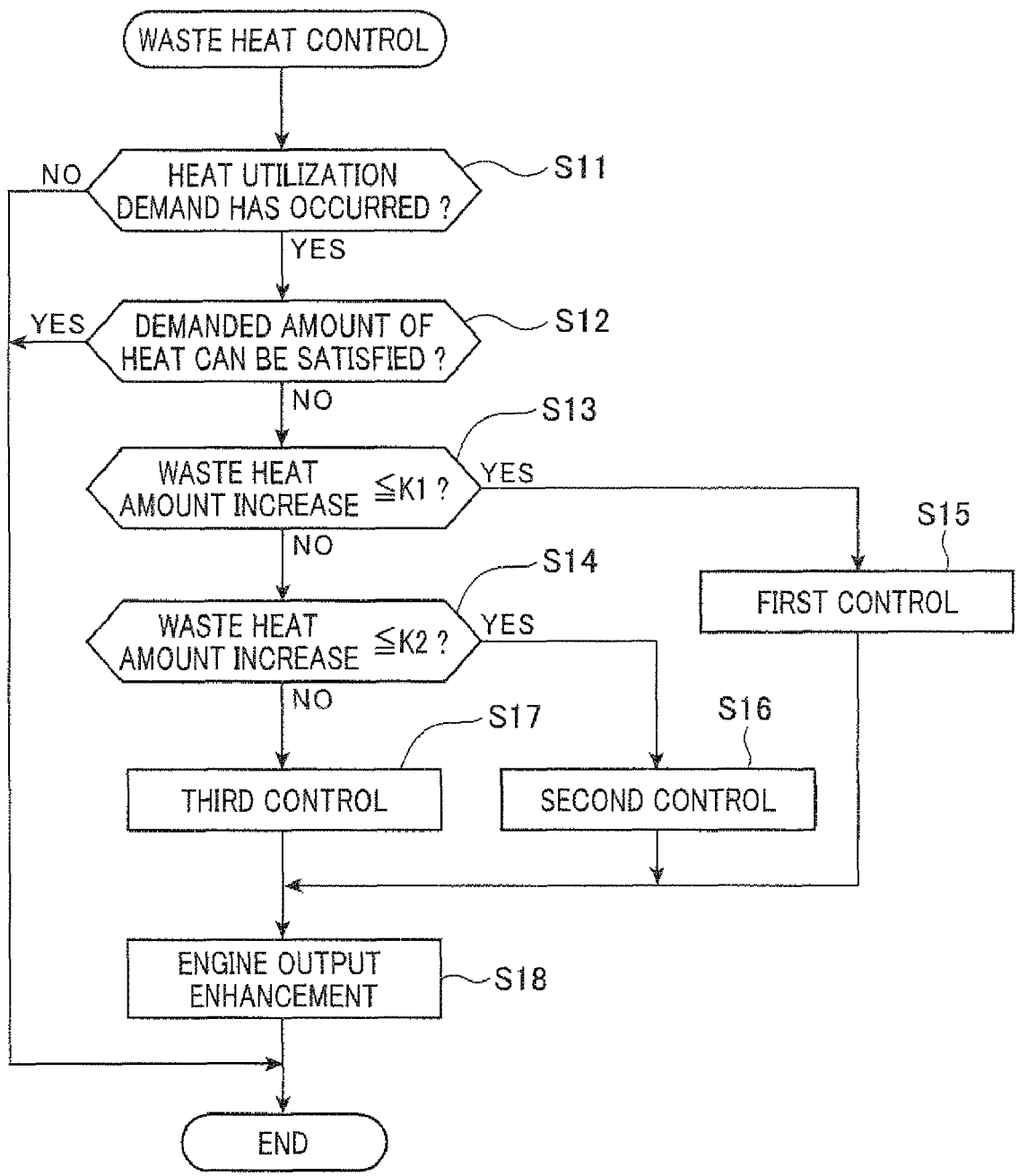
FIG. 5 is a flowchart showing the process of the waste heat control performed by the waste heat control apparatus of the first embodiment.

FIG. 5 is a flowchart showing the process of the waste heat control. This process is performed repeatedly at predetermined time intervals by the ECU 40.

This process begins by determining whether or not the heat utilization demand has occurred at step S11. The heat utilization demand includes the space heating demand and the catalyst heating demand. The space heating demand occurs in response to an operation of the vehicle driver or passenger to heat the vehicle cabin, or a control command issued from an automatic air conditioner. The catalyst heating demand occurs when the catalyst 22 mounted on the exhaust pipe 12 is low, for example when the engine 10 is cold-started, or when the temperature of the catalyst 22 decreases for some reason when the engine 10 is in the running state. For example, when the engine 10 is provided with idle-stop control (automatic engine stop-restart control), it may occur that the temperature of the catalyst 22 decreases below a predetermined temperature while the idle stop control is in operation. In this case, the catalyst heating demand occurs after restart of the engine 10. If the determination result at step S11 is negative, the process is terminated, and otherwise, the process proceeds to step S12.

At step S12, it is determined whether or not the demanded amount of heat at this moment can be satisfied by normal engine control which provides the highest fuel efficiency, that is whether or not the waste heat mount has to be increased by any of the first to third waste heat amount adjusting sections. For example, when the space heating demand has occurred, it is determined whether or not the cooling water temperature Tw is below the suitable temperature range between TH1 and TH0. If the determination result at step S12 is affirmative, since it means that it is not necessary to increase the waste heat amount, the process is terminated. If the determination result at step S12 is negative, the process proceeds to step S13.

As explained in the following, at steps S13 to S17, it is determined to what extent the waste heat amount has to be increased, and then the waste heat control is performed in accordance with the determined extent of the increase. For example, when the space heating demand has occurred, the cooling water temperature Tw is compared with each of a plurality of temperature thresholds set on the lower side of the suitable temperature range to determine in which range the cooling water temperature Tw is included at every moment, in order to perform the waste heat control depending on the temperature range in which the cooling water Tw is included.

In more detail, it is determined whether or not the increase amount of the waste heat is lower than a first demanded amount K1 at step S13, and it is determined whether or not the increase amount of the waste heat is lower than a second demanded amount K2 larger than the demand amount K1 at step S14. The number of the demanded amount thresholds (K1 and K2) may be three or more.

The process proceeds to step S15 if the determination result at step S13 is affirmative, proceeds to step S16 if the determination result at step S13 is negative and the determination result at step S14 is affirmative, and proceeds to step S17 if the determination result at step S14 is negative. At step S15, first control is performed as the waste heat control to increase the waste heat amount by a relatively small value. At step S16, second control is performed as the waste heat control to increase the waste heat amount by a relatively moderate value. At step S17, third control is performed as the waste heat control to increase the waste heat amount by a relatively large value.

In more detail, in the case where the space heating demand has occurred, step S13 determines whether or not the cooling water temperature Tw is included in a first range (the temperature range between TH1 and TH2 shown in FIG. 4), and steps S14 determines whether or not the cooling water temperature Tw is included in a second range (the temperature range between TH2 and TH3 shown in FIG. 4).

If the cooling water temperature TW is detected to be within the first temperature range, the first waste heat amount adjusting section (delaying the ignition timing+late opening the exhaust valve) performs the first control at step S15. If the cooling water temperature TW is detected to be within the second temperature range, the third waste heat amount adjusting section (delaying the ignition timing) performs the second control at step S16. The third control may be or may not be performed in this case.

Finally, at step S18, an engine output enhancing process is performed by the engine output enhancing section. The engine output enhancing process is a process to enhance the engine output which has been lowered due to performing the waste heat control by increasing the amount of fuel injection, or increasing the intake air amount (throttle valve opening). The function of the engine output enhancing section is implemented by the microcomputer of the ECU 40 executing a program stored in its ROM or RAM.

The first embodiment described above provides the following advantages.

The first embodiment is configured such that when the heat utilization demand such as the space heating demand or the catalyst heating demand has occurred, at least one of the plurality of the waste heat amount adjusting sections is selected in accordance with the demanded amount of heat to perform the waste heat control. Accordingly, according to this embodiment, is it possible to perform the waste heat control optimally, and to suppress disadvantage such as lowering of the running efficiency of the engine to a minimum.

The plurality of the waste heat amount adjusting sections provide different increase amounts of the waste heat. Accordingly, even when the demanded amount of heat fluctuates, since an appropriate one of the plurality of the waste heat amount adjusting sections can be selected depending on the value of demanded amount of heat at every moment, it is possible to optimally respond to the heat utilization demand.

This embodiment is configured such that the engine output is enhanced to compensate for the decrease of the engine output due to performing the waste heat control. Accordingly, according to this embodiment, the drivability of the vehicle can be prevented from degrading during a period of time in which the waste heat control is performed, because the energy for running the vehicle can be maintained during this period of time.

Second Embodiment

Next, a second embodiment of the invention is described with a focus on the difference with the first embodiment. The second embodiment is configured to calculate a waste heat efficiency η representing a ratio of an increase amount of the waste heat (may be referred to simply as "heat amount increase" hereinafter) to an increase amount of fuel injection (may be referred to simply as "fuel amount increase" hereinafter) when the waste heat control is performed for each of the plurality of the waste heat amount adjusting sections, and selects at least one of the plurality of the waste heat amount adjusting sections which should operate to increase the waste heat amount on the basis of the calculated waste heat efficiencies η as control parameters.

The waste heat efficiency η, which may be expressed as a percent, is given by the equation of $\eta=\Delta Q[kW]/\Delta qf [kW]$, where $\Delta Q$ is the heat amount increase, and $\Delta qf$ is the fuel amount increase. The fuel amount increase $\Delta Q$ is an amount of heat creatable by the waste heat amount adjusting section which performs the ignition timing delay control, or valve timing shift control. Since the waste heat efficiency η is a value representing a ratio of the creatable amount of heat to the increase amount of fuel injection, the waste heat efficiency η can be regarded as a creatable heat efficiency.

In this embodiment, the waste heat efficiency is calculated for n (n being a positive integer larger than 1) waste heat amount adjusting section as $\eta 1$ to $\eta n$, and the calculated waste heat efficiencies $\eta 1$ to $\eta n$ are sorted in the order from high to low. At least one of the heat efficiencies $\eta 1$ to $\eta n$ is selected in accordance with the demanded amount of heat of the heat utilization demand, referring to the result of the sort. In more detail, the waste heat amount adjusting section having the highest waste heat efficiency is selected to perform the waste heat control. The waste heat efficiencies $\eta 1$ to $\eta n$ of the respective waste heat amount adjusting section are calculated depending on the engine running state at every moment. Also, the heat amount increase is calculated depending on the engine running state at every moment for the respective waste heat amount adjusting section as $\Delta Q1$ to $\Delta Qn$.

This embodiment is also configured to calculate a total increase amount of fuel injection, and performs engine output control on the basis of the calculated total increase amount of fuel injection as the engine output enhancing process to compensate for the decrease of the engine output due to performing the waste heat control.

Figure 6:
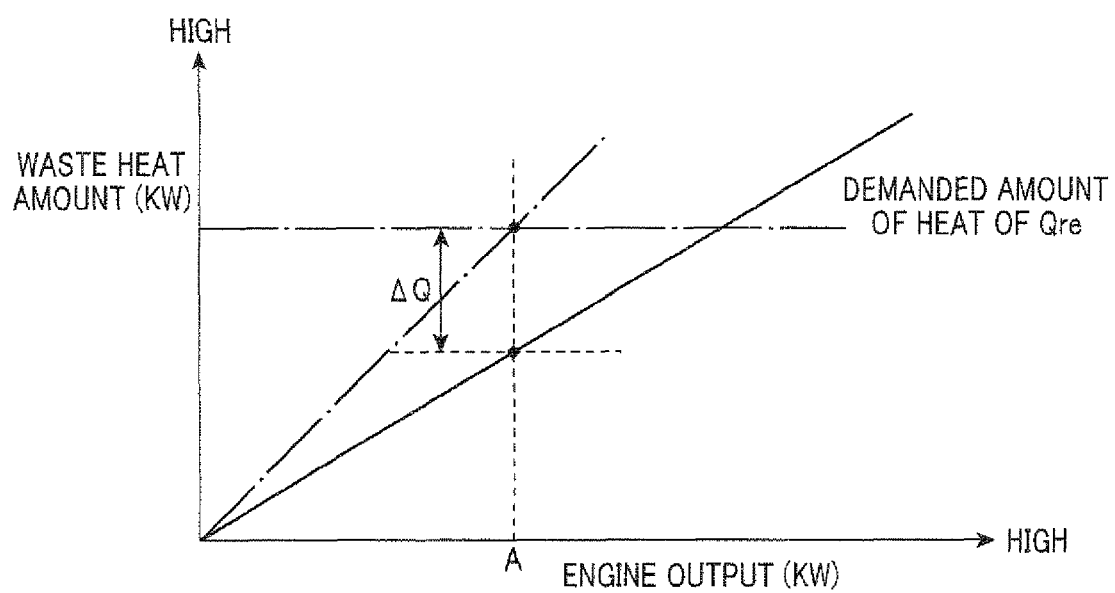
FIG. 6 is a graph showing a relationship between the output of the engine and the amount of waste heat emitted from the engine.

FIG. 6 is a diagram showing a relationship between the engine output [kW] and the waste heat amount [kW]. In FIG. 6, the solid line shows this relationship at the highest fuel efficiency point.

Here, it is assumed that the demanded amount of heat of Qre has occurred when the output of the engine running at the highest fuel efficiency point is A. In this case, as shown in FIG. 6, there occurs a shortage of the waste heat amount by $\Delta Q$. To compensate for this shortage, the waste heat control is performed. In order to respond to the demanded amount of heat of Qre, it is necessary to shift the control point (engine running point) from the highest fuel efficiency point toward a side at which the fuel injection increases (toward a side at which fuel efficiency is lowered). To perform this shift, selection (switching) from among the plurality of the waste heat amount adjusting sections is performed in accordance with the waste heat efficiencies $\eta 1$ to $\eta n$. Further, since the engine output decreases when the waste heat amount is increased, the engine output enhancing process is performed to compensate for the decrease of the engine output.

Figure 7:
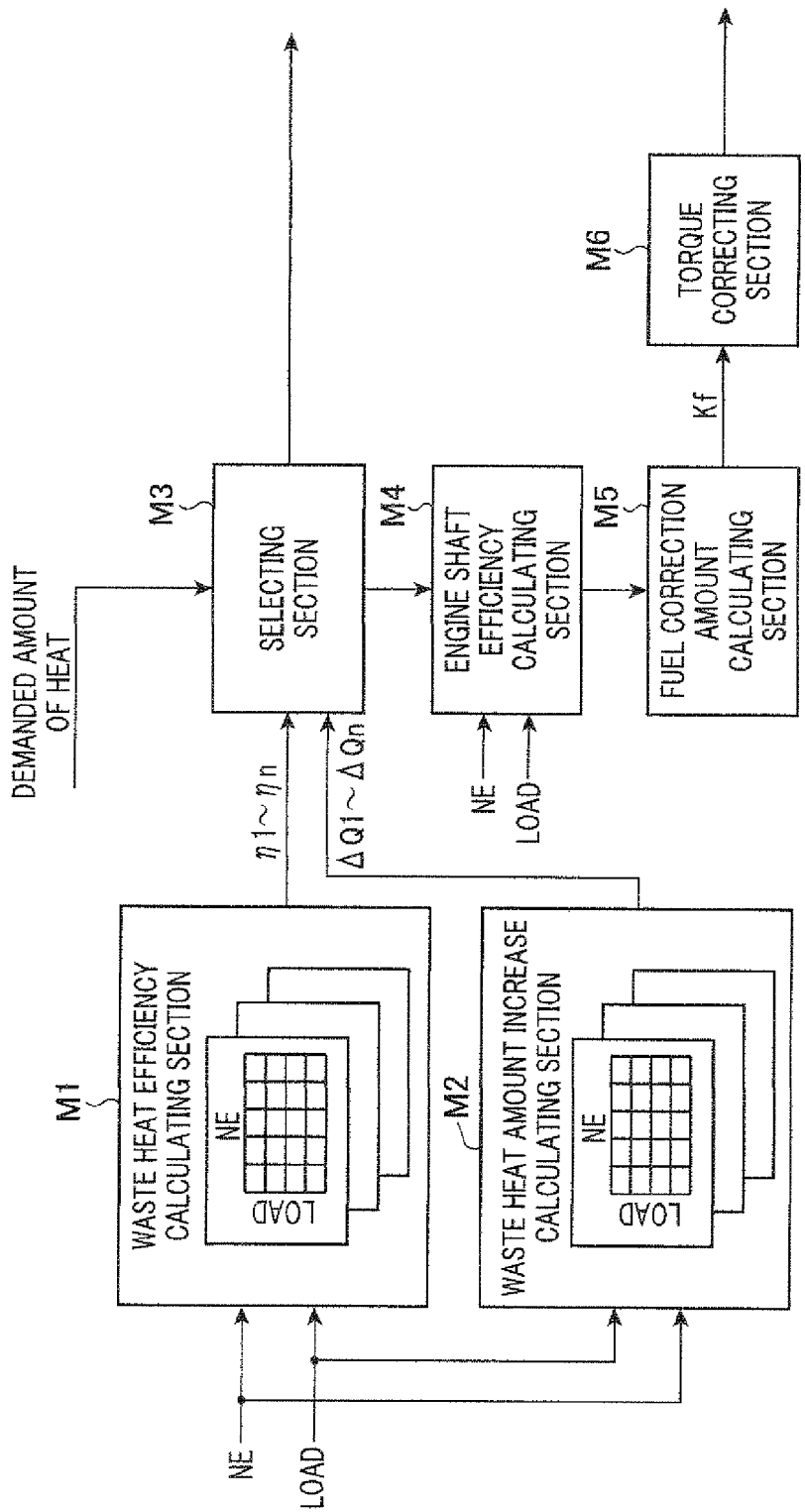
FIG. 7 is a functional block diagram for explaining waste heat control performed by a waste heat control apparatus according to a second embodiment of the invention.

FIG. 7 is a functional block diagram for explaining the waste heat control performed by the waste heat control apparatus of the second embodiment.

A waste heat efficiency calculating section M1 calculates the waste heat efficiencies $\eta 1$ to $\eta n$ for the respective waste heat amount adjusting section in accordance with the engine running state at every moment by use of a plurality of efficiency calculating maps provided for the respective waste heat amount adjusting section. The control parameters representing the engine running state include, for example, the engine rotation speed NE and engine load such as the air inlet pipe pressure or the intake air flow rate. It is also possible to calculate the waste heat efficiencies $\eta 1$ to $\eta n$ by arithmetic operations by use of constants set in advance for the respective waste heat amount adjusting section.

A heat amount increase calculating section M2 calculates the heat amount increases $\Delta Q1$ to $\Delta Qn$ for the respective waste heat amount adjusting section in accordance with the engine running state at every moment by use of a plurality of heat amount calculating maps provided for the respective waste heat amount adjusting section. It is also possible to calculate the heat amount increases $\Delta Q1$ to $\Delta Qn$ by arithmetic operations by use of constants set in advance for the respective heat amount adjusting section.

A selecting section M3 sorts the waste heat efficiencies $\eta 1$ to $\eta n$ calculated by the waste heat efficiency calculating section M1 in the order from high to low, and selects the waste heat amount adjusting section having the highest efficiency as the one which should currently perform the waste heat control. In this case, since it is also necessary to satisfy the demanded amount of heat at every moment, the heat amount increases $\Delta Q1$ to $\Delta Qn$ calculated by the heat amount increase calculating section M2 have to be taken into consideration. Accordingly, the selecting section M3 selects at least one of the waste heat amount adjusting sections which can satisfy the demanded amount of heat and has the best or better waste heat efficiency as the one which should currently perform the waste heat control.

A engine shaft efficiency calculating section M4 calculates the engine shaft efficiency $\eta t$ for each of the waste heat amount adjusting section selected by the selecting section M3 in accordance with the engine running state (NE or the engine load) at every moment by use of a plurality of the efficiency calculating maps provided for the respective waste heat amount adjusting section or by arithmetic operations. In this embodiment, both the engine shaft efficiency $\eta tA$ before the waste heat amount is increased and the engine shaft efficiency $\eta tB$ after the waste heat amount is increased.

A fuel correction amount calculating section M5 calculates the fuel amount increase $\Delta qf$ for each of the waste heat amount adjusting section selected by the selecting section M3 on the basis of the engine shaft efficiency $\eta t$ calculated by the engine shaft efficiency calculating section M4, and calculates a total amount of the fuel amount increase $\Delta qf$ ($\Sigma \Delta qf$) as a fuel correction amount Kf. The fuel amount increase $\Delta qf$ can be calculated by the equation of $\Delta qf=(1-\eta tB/\eta tA) \times qfin$, where qfin is the amount of fuel injection after increase of the waste heat amount. In this case, if the engine shaft efficiency (fuel efficiency) is lowered after the waste heat amount is increased, the value of $\Delta qf$ increases with the decreases of the value of $\eta tB$. As a result, the fuel amount increase $\Delta qf$ to compensate for the decrease of the fuel efficiency is calculated.

The fuel correction amount Kf ($\Sigma \Delta qf$) is an increase amount of fuel injection to compensate for the decrease of the engine output due to performing the waste heat control. A torque correcting process is performed as the output enhancing process by use of this fuel correction amount Kf.

A torque correcting set ion M6 issues a command to correct the throttle opening, and a command to correct the amount of fuel injection in accordance with the fuel correction amount Kf calculated by the fuel correction amount calculating section M5. At this time, a correction amount of the intake air is calculated on the basis of a target air-fuel ratio and the fuel correction amount Kf, and a throttle opening command value is calculated on the basis of the calculated correction amount of the intake air. Also, correction is made to the amount of fuel injection by the fuel correction amount Kf.

The functions of the above section M1 to M5 are implemented by the microcomputer of the ECU 40 executing programs stored in its ROM or RAM.

Figure 8:
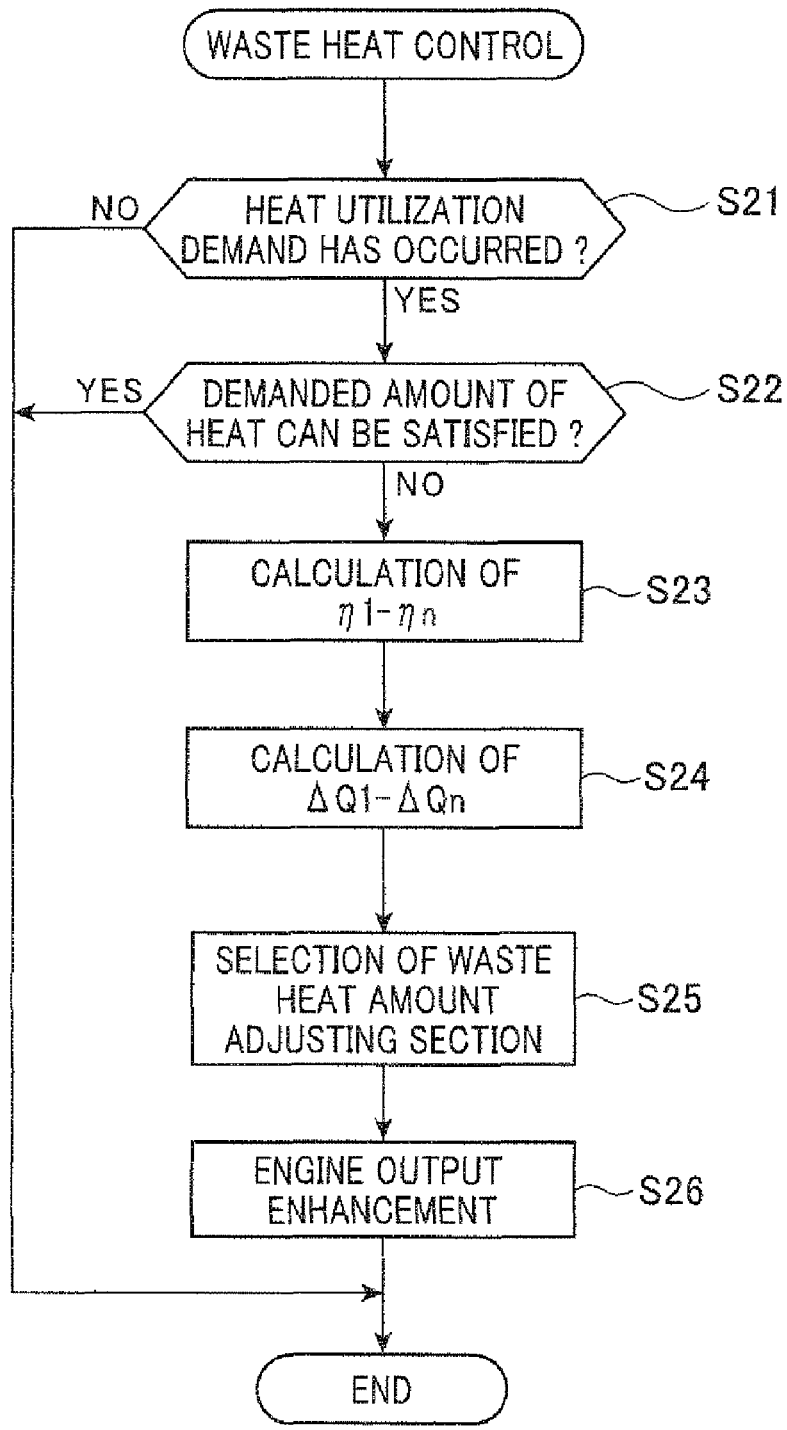
FIG. 8 is a flowchart showing the process of the waste heat control performed by the waste heat control apparatus of the second embodiment.

FIG. 8 is a flowchart showing the process of the waste heat control performed repeatedly at predetermined time intervals by the waste heat control apparatus of the second embodiment.

This process begins by determining whether or not the heat utilization demand has occurred at step S21. If the determination result at step S1 is affirmative, the process proceeds to step S22 to determine whether or not it is possible to respond to the demanded amount of heat by keeping the normal engine control to run the engine at the highest fuel efficiency point. If the determination result at step S22 is negative, the process proceeds to step S23.

At step 523, the waste heat efficiencies $\eta 1$ to $\eta n$ of the respective waste heat amount adjusting section are calculated by use of the efficiency calculating maps of the respective waste heat amount adjusting section. At subsequent step S24, the heat amount increases $\Delta Q1$ to $\Delta Qn$ for the respective waste heat amount adjusting section are calculated by use of the heat amount calculating maps of the respective waste heat amount adjusting section.

Next, at step S25, the waste heat efficiencies $\eta 1$ to $\eta n$ calculated at step S23 are sorted in the order from high to low, and the waste heat amount adjusting section having the highest or higher efficiency and being respondable to the demanded amount of heat at the time is selected as the one which should currently perform the waste heat control.

At subsequent step S26, the engine output enhancing process is performed. In more detail, at step S26, the total increase amount of fuel injection $\Sigma \Delta qf$ for the waste heat amount adjusting section to currently perform the waste heat control is calculated, and the calculated total increase amount of fuel injection $\Sigma \Delta qf$ is set as the fuel correction amount Kf. Thereafter, the intake air amount enhancing process or the fuel injection amount enhancing process is performed.

According to the second embodiment of the invention, it is possible to perform the waste heat control in accordance with the heat utilization demand at every moment like the first embodiment, and further to reduce the disadvantage such as the decrease of the engine running efficiency due to performing the waste heat control to a minimum.

The second embodiment is configured to calculate the waste heat efficiencies $\eta 1$ to $\eta n$ (a ratio of an increase amount of the waste heat to an increase amount of fuel injection) for the respective waste heat amount adjusting section, and perform the waste heat control using the calculated waste heat efficiencies $\eta 1$ to $\eta n$ as control parameters. Further, the second embodiment is configured to preferentially select the waste heat amount adjusting section having a higher waste heat efficiency to perform the waste heat control. This makes it possible to perform the waste heat control, while monitoring the fuel efficiency in order to suppress the decrease of the fuel efficiency to a minimum.

The waste heat efficiencies $\eta 1$ to $\eta n$ of the respective waste heat amount adjusting section are calculated depending on the engine running state, and accordingly, it is possible to perform the waste heat control more optimally, while taking into consideration that the waste heat efficiencies $\eta 1$ to $\eta n$ of the respective waste heat amount adjusting section vary with the engine running state.

Other Embodiments

It is a matter of course that various modifications can be made to the above first and second embodiments as described below.

The above embodiments may be modified such that an increasable range (dynamic range) of the waste heat amount of the engine 10 is set in advance for each of the plurality of the waste heat amount adjusting sections, and the waste heat amount adjusting section having the largest increasable range is selected as the one to perform the waste heat control. For example, in the first embodiment including the first waste heat amount adjusting section (delaying the ignition timing+ late opening the exhaust valve), the second waste heat amount adjusting section (delaying the ignition timing+early opening the inlet valve), and the third waste heat amount adjusting section (delaying the ignition timing), if the increasable range is larger in the order from the third to first waste heat amount adjusting section 3, the third waste heat amount adjusting section is selected to perform the waste heat control. In this case, it is preferable to calculate the increasable range of the waste heat amount for each of the plurality of the waste heat amount adjusting sections in accordance with the engine running state.

According to the above configuration, since it becomes unnecessary to change the waste heat amount adjusting section to another one when variation of the demanded amount of heat is relatively small, the frequency of switching among the plurality of the waste heat amount adjusting sections can be reduced. This makes it possible to suppress variation of the engine running state due to performing switching among the plurality of the waste heat amount adjusting sections, which causes degradation of the driverability.

The above embodiments may be configured such that the number of the waste heat amount adjusting section which perform the waste heat control at the same time is increased with the increase of the demanded amount of heat.

According to this configuration, when the demanded amount of heat is relatively small, since the number of the waste heat amount adjusting section which perform the waste heat control at the same time is small, interference in control among the plurality of the waste heat amount adjusting sections performing the waste heat control at the same time can be suppressed. Further, when the demanded amount of heat is relatively large, since the number of the waste heat amount adjusting sections which perform the waste heat control at the same time is large, the large demanded amount of heat can be satisfied easily.

The plurality of the waste heat amount adjusting section may be such as to differently vary the running efficiency of the engine 10. In this case, targets to be controlled respectively by the plurality of the waste heat amount adjusting sections may be the same. For example, when their control targets are the ignition timing, selection is made from among a plurality of ignition timing maps prepared for different engine running efficiencies in accordance with the content of the heat utilization demand or the demanded amount of heat at every moment. In this case, when an ignition timing map to decrease more the engine running efficiency is selected, the ignition timing is delayed more, and the waste heat amount is increased more. Also according to this configuration, it is possible to perform the waste heat control in accordance with the heat utilization demand at every moment, while suppressing to a minimum the disadvantage such as the decrease of the engine running efficiency due to performing the waste heat control.

The plurality of the waste heat amount adjusting sections may have different response characteristics with regard to variation of the waste heat amount.

The above embodiments may be modified to include a cooling loss increasing section for increasing the waste heat amount mainly by increasing the cooling loss, and an exhaust loss increasing section for increasing the waste heat amount mainly by increasing the exhaust loss, and to increase the waste heat amount by one of the cooling loss increasing section and the exhaust loss increasing section selected in accordance with at least one of the content of the heat utilization demand and the demanded amount of heat. The cooling loss increasing section may be a section for increasing the in-cylinder temperature (combustion temperature) by adjusting the EGR gas amount, or delaying the ignition timing maintaining the torque, or a section for prolonging the period during which high-temperature combustion gas stays in the cylinder by delaying the opening timing of the exhaust valve. The exhaust loss increasing section may be a section for burning the exhaust gas in the exhaust pipe by greatly delaying the ignition timing, or by opening the exhaust valve early. Other than the above, the exhaust loss increasing section may be a section for slowing the combustion speed by increasing the internal. EGR amount or the external EGR amount by the EGR device.

Generally, it is advantageous to use the heat energy by the cooling loss to respond to the space heating demand, and use the heat energy by the exhaust loss to respond to the catalyst heating demand. Accordingly, this modification is configured such that when the space heating demand has occurred, the waste heat amount is increased by use of the cooling loss increasing section, and when the catalyst heating demand has occurred, the waste heat amount is increased by use of the exhaust loss increasing section.

In the second embodiment, the control parameters may include, other than the waste heat efficiencies $\eta 1$ to $\eta n$ of the respective waste heat amount adjusting section, increasable ranges (dynamic ranges) of the respective waste heat amount adjusting section, so that the waste heat amount can be increased in accordance with either the waste heat efficiencies $\eta 1$ to $\eta n$ or the increasable ranges. This configuration makes it possible to perform the waste heat control while suppressing lowering of the fuel consumption to a minimum, and also to respond to a large value of the demanded amount of heat.

Figure 9:
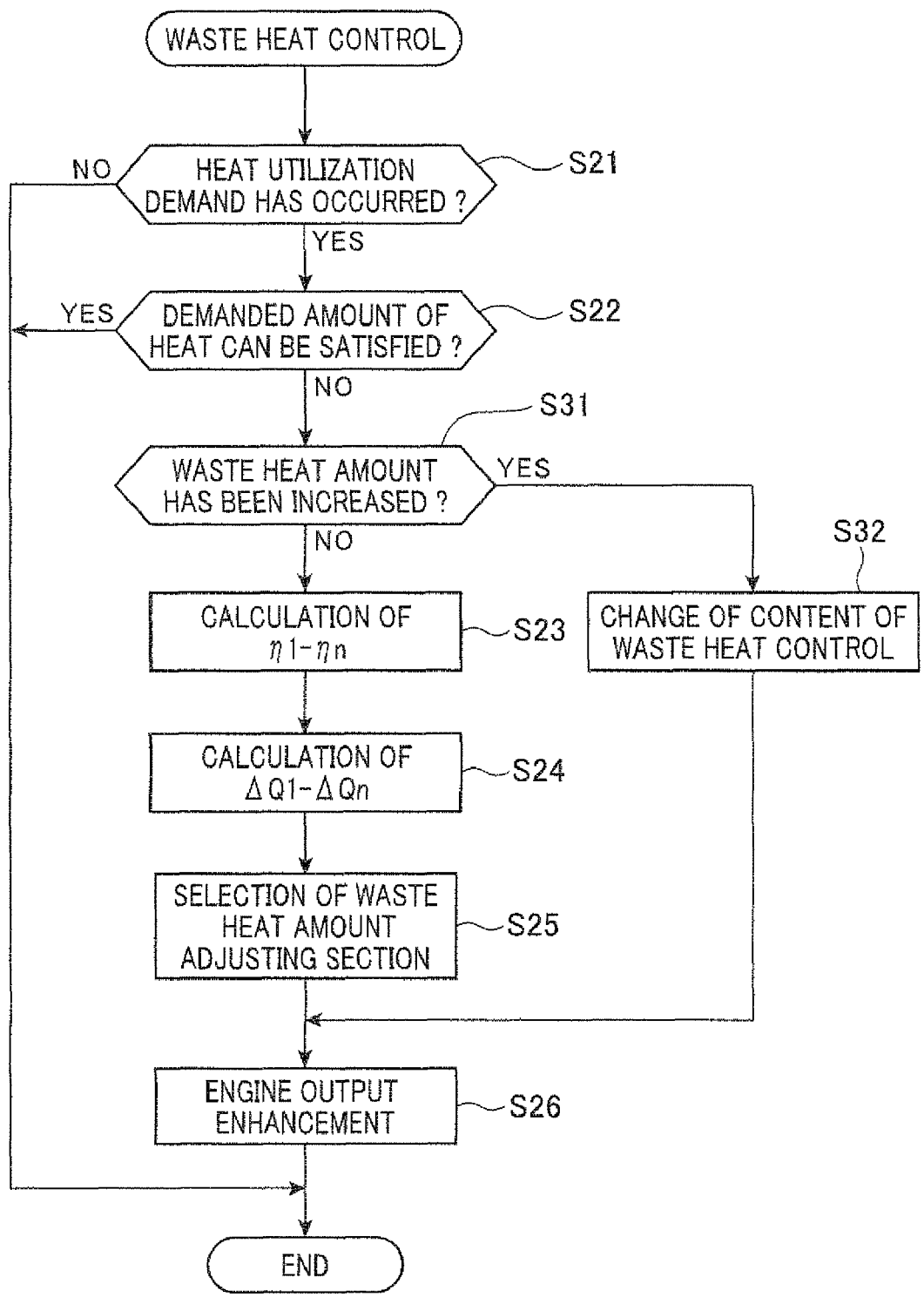
FIG. 9 is a flowchart showing the process of a modification of the waste heat control performed by the waste heat control apparatus of the second embodiment.

The process of the waste heat control in the second embodiment may be modified to the one shown in FIG. 9. In FIG. 9, the steps identical to those in FIG. 8 are given the same step numbers, and explanations thereof are omitted or abridged. The process of FIG. 9 includes additional steps S31 and S32.

In the process of FIG. 9, when there occurs the heat utilization demand ("YES" at step S21), and the demanded amount of heat cannot be satisfied ("NO" at step S22), the process proceeds to step S31 to determine whether or not the waste heat amount has been already increased. It is preferable to determine at this time whether or not a predetermined period of time has elapsed from the time of the start of the increase of the waste heat amount. If the determination result at step S31 is negative (if the predetermined period of time has not yet elapsed), the process proceeds to step S23. At step S23 and the following steps S24 and S25, calculation of the waste heat efficiencies $\eta 1$ to $\eta n$, calculation of the heat amount increases $\Delta Q1$ to $\Delta Qn$, selection from among the plurality of the waste heat amount adjusting sections in accordance with calculated heat efficiencies $\eta 1$ to $\eta n$ are performed.

On the other hand, if the determination result at step S31 is affirmative (if the predetermined period of time has elapsed), since it means that the demanded amount of heat could not be satisfied, the process proceeds to step S32 to change the content of the waste heat control. In this case, if it is possible to further increase the waste heat amount by the waste heat amount adjusting section currently in use, this same waste heat amount adjusting section is used, and otherwise, another waste heat amount adjusting section is used instead, or added.

According to the process shown in FIG. 9, it is possible to perform the waste heat control, while monitoring whether the demanded amount of heat has been satisfied.

In the second embodiment, there may occur a case in which the fuel injection amount is decreased at the time of increasing the waste heat amount. In this case, the waste heat efficiency $\eta$ is calculated by the equation of $\eta=\Delta Q[kW]/\Delta qf [kW]$, where $\Delta Q$ is the heat amount increase, and $\Delta qf$ is a decrease amount of the fuel injection. It is preferable that the waste heat control is performed on the basis of the waste heat efficiency $\eta$, while suppressing the decrease of the fuel efficiency to a minimum also in such a case.

In the above embodiments, each waste heat amount adjusting section has the function to delay the ignition timing, or early open the inlet valve, or late open the exhaust valve in order to increase the waste heat amount. However, the waste heat amount adjusting section may have a different function to increase the waste heat amount. For example, the waste heat amount can be increased by excessively advancing the ignition timing in an area with sufficient margin to engine knocking, or by adjusting the external EGR amount by the EGR device, or by controlling the cooling water flow rate by use of an electric water pump, or by controlling the intake air flow rate. To control the intake air flow rate, the opening degree of a TCV (tumble control valve) or a SCV (swirl control valve) mounted on the inlet pipe may be controlled.

In addition to the above, the waste heat amount adjusting section may have a function to perform shift control of a transmission to increase the waste heat amount.

The present invention can be also applied to an engine system to control a diesel engine. In this case, each waste heat amount adjusting section includes one of a function to control the valve opening/closing timing (late opening or early opening) of the exhaust valve, a function to control the valve opening/closing timing (late opening or early opening) of the inlet valve, a function to introduce the external EGR, a function to control the charging pressure of a turbocharger, and a function to control the flow rate of the intercooler cooling water.

The heat utilization demand may include, other than the space heating demand and the catalyst heating demand, a demand to increase the temperature of a vehicle-mounted component such as a vehicle battery. For example, when a high-voltage battery is mounted on a vehicle as a power source of a vehicle running motor, the heat utilization demand may be a battery heating demand to keep the high-voltage battery above a predetermined temperature so that the high-voltage battery can supply electric power stably. In this case, when the vehicle runs at a low outside air temperature, or when the vehicle runs during nighttime or during the winter season, a demand to increase the battery temperature occurs as the heat utilization demand, and the waste heat control is performed by use of at least one of the plurality of the waste heat amount adjusting sections to respond to this demand.

The above explained preferred embodiments are exemplary of the invention of the present application which is described solely by the claims appended below. It should be understood that modifications of the preferred embodiments may be made as would occur to one of skill in the art.

What is claimed is:

1. A waste heat control apparatus for use in a heat recovery system for recovering and reusing waste heat of an engine comprising:
 a processing system, comprising a computer processor, the processing system configured to:
  implement a plurality of waste heat amount adjusting sections activated to increase an amount of the waste heat of the engine; and
  perform waste heat control in accordance with a heat utilization demand to increase the amount of the waste heat of the engine by activating at least one of the plurality of waste heat amount adjusting sections; wherein:
 an increase amount of the waste heat obtained by performing the waste heat control is different for the plurality of the waste heat amount adjusting sections, and the processing system is configured to select at least one of the waste heat amount adjusting sections in accordance with a demanded amount of heat designated in the heat utilization demand as the one to be activated; and
 an increasable range of the waste heat obtained by performing the waste heat control is different for the plurality of the waste heat amount adjusting sections, and the processing system is configured to select more preferentially the waste heat amount adjusting section having a higher value of the increasable range as the one to be activated.

2. The waste heat control apparatus according to claim 1, wherein the number of the waste heat amount adjusting section selected by the processing system increases with increase of the demanded amount of heat.

3. The waste heat control apparatus according to claim 1, wherein each of the plurality of the waste heat amount adjusting sections includes one of a first function to increase a cooling loss of the engine to increase the amount of the waste heat, and a second function to increase an exhaust loss of the engine to increase the amount of the waste heat, and the processing system is configured to determine which one of the first and second functions should be used to increase the amount of the waste heat in accordance with at least one of content of the heat utilization demand and the demanded amount of heat.

4. The waste heat control apparatus according to claim 1, wherein the processing system is configured to select at least one of the plurality of the waste heat amount adjusting sections used to perform the waste heat control on the basis of waste heat efficiencies of the plurality of the waste heat amount adjusting sections, the waste heat efficiency representing a ratio of an increase amount of the waste heat over an increase amount of fuel injection when the waste heat control is performed.

5. The waste heat control apparatus according to claim 4, wherein the processing system is configured to calculate the waste heat efficiency of each of the plurality of the waste heat amount adjusting sections, and select more preferentially the waste heat adjusting section having a higher value of the waste heat efficiency as the one to be activated.

6. The waste heat control apparatus according to claim 4, wherein the processing system is configured to calculate the waste heat efficiencies depending on a running state of the engine.

7. The waste heat control apparatus according to claim 4, wherein an increasable range of the waste heat obtained by performing the waste heat control is different for the plurality of the waste heat amount adjusting sections, and the processing system is configured to select at least one of the waste heat amount adjusting section on the basis of the waste heat efficiencies of the plurality of the waste heat amount adjusting sections, and the increasable ranges of the waste heat of the plurality of the waste heat amount adjusting sections.

8. The waste heat control apparatus according to claim 1, wherein the processing system is further configured to perform an engine output enhancing process to increase an output of the engine to compensate for decrease of the output of the engine due to performing the waste heat control.

9. The waste heat control apparatus according to claim 8, wherein the processing system is further configured to calculate a total increase amount of fuel injection necessary to perform the waste heat control, and perform the engine output enhancing process on the basis of the total increase amount of fuel injection.

10. A method of controlling waste heat in a heat recovery system for recovering and reusing waste heat of an engine, the method comprising:
 implementing, using a processing system comprising a computer processor, a plurality of waste heat amount adjusting sections activated to increase an amount of the waste heat of the engine; and
 performing waste heat control in accordance with a heat utilization demand to increase the amount of the waste heat of the engine by activating at least one of the plurality of waste heat amount adjusting sections; wherein an increase amount of the waste heat obtained by performing the waste heat control is different for the plurality of the waste heat amount adjusting sections, and at least one of the waste heat amount adjusting sections is selected in accordance with a demanded amount of heat designated in the heat utilization demand as the one to be activated; and an increasable range of the waste heat obtained by performing the waste heat control is different for the plurality of the waste heat amount adjusting sections, the waste heat amount adjusting section having a higher value of the increasable range is selected more preferentially as the one to be activated.

11. The method according to claim 10, wherein the number of the waste heat amount adjusting section selected increases with increase of the demanded amount of heat.

12. The method according to claim 10, wherein each of the plurality of the waste heat amount adjusting sections includes one of a first function to increase a cooling loss of the engine to increase the amount of the waste heat, and a second function to increase an exhaust loss of the engine to increase the amount of the waste heat, and which of the first and second functions should be used to increase the amount of the waste heat is determined in accordance with at least one of content of the heat utilization demand and the demanded amount of heat.

13. The method according to claim 10, wherein at least one of the plurality of the waste heat amount adjusting sections used to perform the waste heat control is selected on the basis of waste heat efficiencies of the plurality of the waste heat amount adjusting sections, the waste heat efficiency representing a ratio of an increase amount of the waste heat over an increase amount of fuel injection when the waste heat control is performed.

14. The method according to claim 13, wherein the waste heat efficiency of each of the plurality of the waste heat amount adjusting sections is calculated, the waste heat adjusting section having a higher value of the waste heat efficiency is selected more preferentially as the one to be activated.

15. The method according to claim 13, wherein the waste heat efficiencies is calculated depending on a running state of the engine.

16. The method according to claim 13, wherein an increasable range of the waste heat obtained by performing the waste heat control is different for the plurality of the waste heat amount adjusting sections, and at least one of the waste heat amount adjusting section is selected on the basis of the waste heat efficiencies of the plurality of the waste heat amount adjusting sections, and the increasable ranges of the waste heat of the plurality of the waste heat amount adjusting sections.

17. The method according to claim 10, further comprising performing an engine output enhancing process to increase an output of the engine to compensate for decrease of the output of the engine due to performing the waste heat control.

18. The method according to claim 17, wherein a total increase amount of fuel injection necessary to perform the waste heat control is calculated, and the engine output enhancing process is performed on the basis of the total increase amount of fuel injection.

* * * * *